Jan. 30, 1945. M. A. MATHYS 2,368,259
HYDRAULIC TRANSMISSION FOR MACHINE TOOLS
Filed Nov. 28, 1940 6 Sheets-Sheet 1

Patented Jan. 30, 1945

2,368,259

UNITED STATES PATENT OFFICE 2,368,259

HYDRAULIC TRANSMISSION FOR MACHINE TOOLS

Max A. Mathys, Detroit, Mich., assignor to Ex-Cell-O Corporation, Detroit, Mich., a corporation of Michigan Application November 28, 1940, Serial No. 367,523

14 Claims. (Cl. 60—52)

The present invention relates to improvements in machine tools, and has particular reference to a new and improved hydraulic transmission.

One of the primary objects of the present invention is to provide a novel hydraulic transmission for a reciprocable carriage which comprises automatic means for reversing the carriage, either with or without a dwell at opposite ends of a predetermined range of movement, in combination with manual control means for effecting immediate reversal of the carriage at any intermediate point of movement.

Another object is to provide a new and improved hydraulic transmission of the foregoing character including a mechanical interlock for rendering the manual control means functionally unavailable at opposite ends of the range of carriage reciprocation to effect movement beyond said range.

A further object is to provide a hydraulic transmission for a reciprocable machine tool element including a novel pilot operated speed and direction control valve of simple and functionally efficient construction.

Still another object is to provide a new and improved hydraulic transmission for a reversible machine tool element adapted for remote manual control as for example to start or stop the operation, to vary the rate of movement, and to reverse the direction of movement.

Other objects and advantages will become apparent as the description proceeds.

In the accompanying drawings,

Fig. 6 is a vertical sectional view through the control panel and taken substantially along line 6—6 of Fig. 4.

Referring more particularly to the drawings, the invention, for purposes of illustration, is disclosed as embodied in a machine tool comprising an elongated hollow base 1 on the top of which a carriage 2 is mounted for longitudinal reciprocation. Two inverted generally U-shaped bridge members 3 are mounted respectively on opposite ends of the base 1, and each serves as a support for one or more, for example, three parallel spindle structures 4.

Suitable spindles 5 are journaled respectively in the structures 4, and are adapted to be driven electrically, with the spindles at opposite ends of the machine under the control of a single-pole double-throw electric switch 6 and limit switches 7 and 8. The switch 6 is adapted to close and open the spindle drive circuits, including the limit switches 7 and 8, on the rear of the machine base 1 (see Fig. 11), to start and stop the spindles alternately, and may be operated by any suitable means. In the present instance, the switch 6 has an actuating stem 9 operatively connected to a piston 10 reciprocable in a stationary hydraulic cylinder 12. Pressure fluid supply lines 14 and 15 open to opposite ends of the cylinder 12, as shown diagrammatically in Fig. 3. The limit switches 7 and 8 are normally open, and are adapted to be closed alternately by a cam 16 mounted on the carriage 2.

Each of the spindles 5 is provided with a brake 18, and the brakes for the two sets of spindles at opposite ends of the machine are connected respectively for joint actuation by two pistons 19 and 20 reciprocable in stationary hydraulic cylinders 21 and 22. Opposite ends of the cylinders 21 and 22 are connected respectively to the pressure fluid supply lines 14 and 15. The arrangement is such that if pressure fluid is supplied to the line 14 and exhausted through the line 15, the switch 6 will condition the drive circuits for the right end spindles 4, and the brakes 18 for the same spindles will be released. Upon movement of the carriage 2 past central position, the cam 16 will close the switch 7 to complete the circuits for the right end spindles which will rotate. During this movement of the carriage, the drive circuits for the left end spindles 4 will be open at the switch 6 even though the switch 8 remains closed until the carriage reaches the central position. Also, the brakes for the left end spindles 4 will be applied so that these spindles will be idle. If pressure fluid is now supplied to the line 15 and exhausted through the line 14, the foregoing condition will be reversed so that the right end spindles will be idle and the left end spindles 4 will be rotating.

Figure 1:
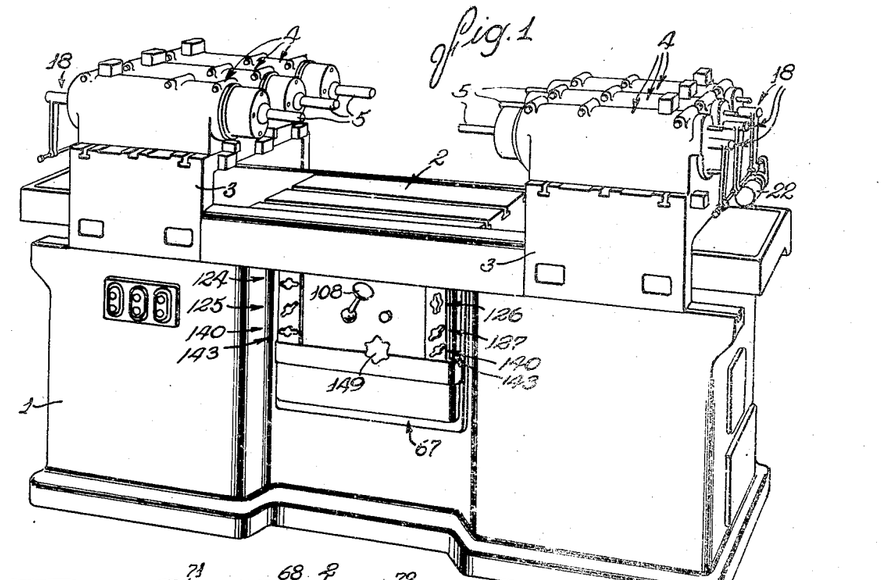
Figure 1 is a view in perspective and on a reduced scale of a machine embodying the features of the invention.
Figure 2:
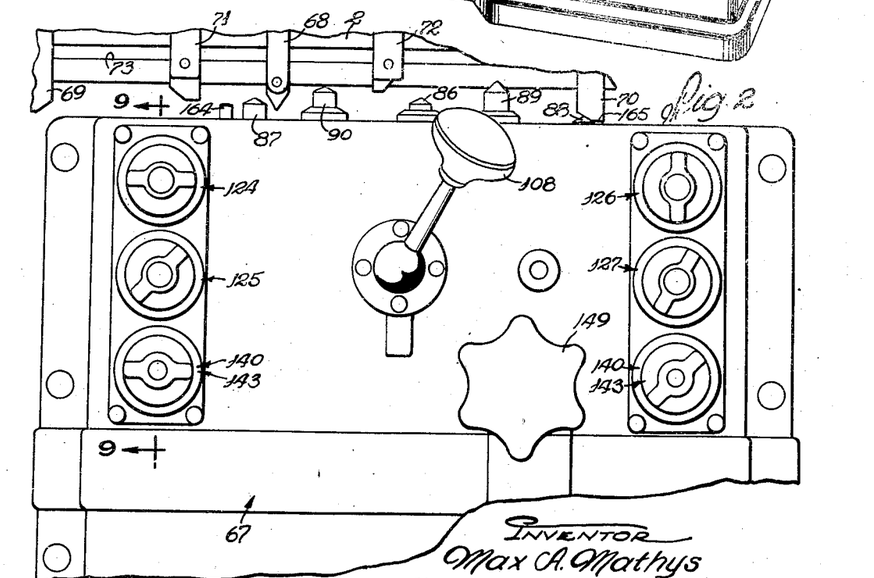
Fig. 2 is a front elevational view on an enlarged scale of the machine control mechanism.
Figure 3:
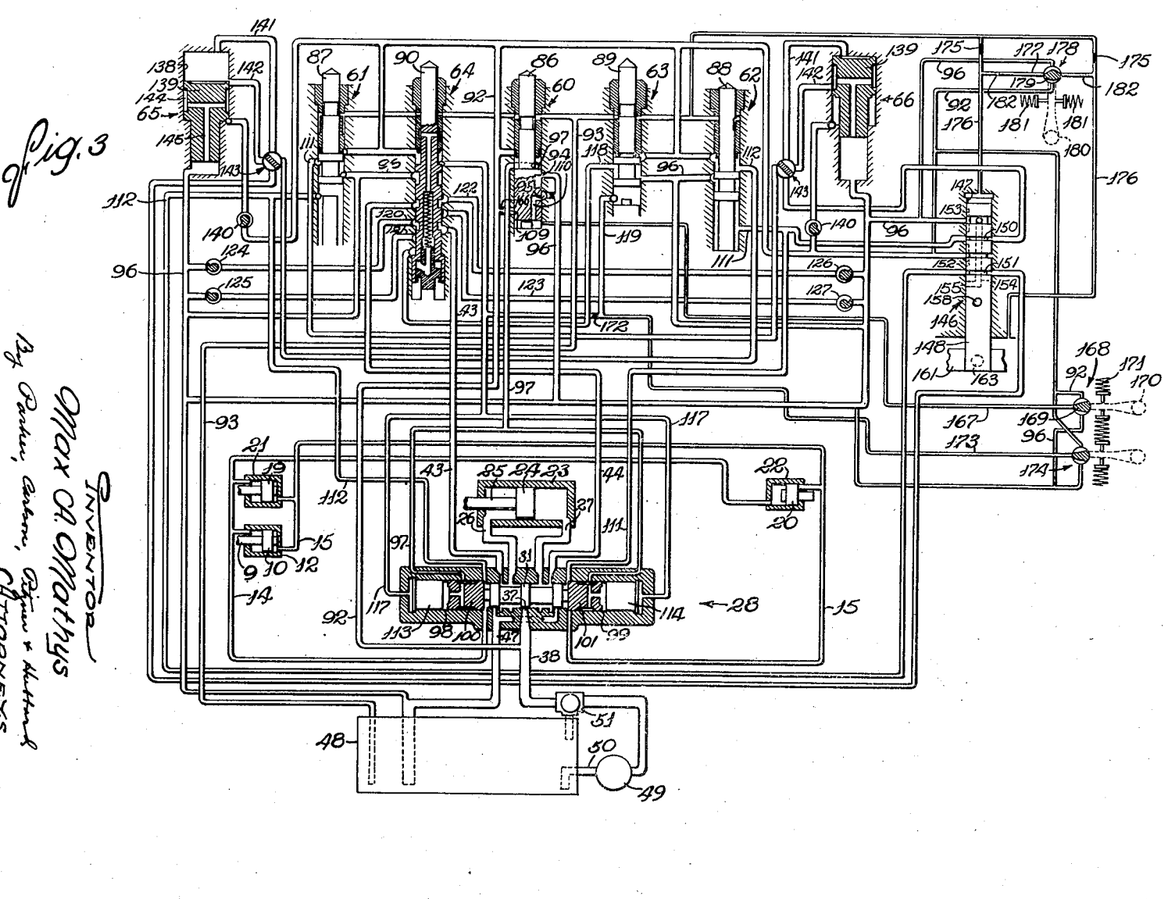
Fig. 3 is a diagrammatic representation of the hydraulic system of the machine.
Figures 4, 5:
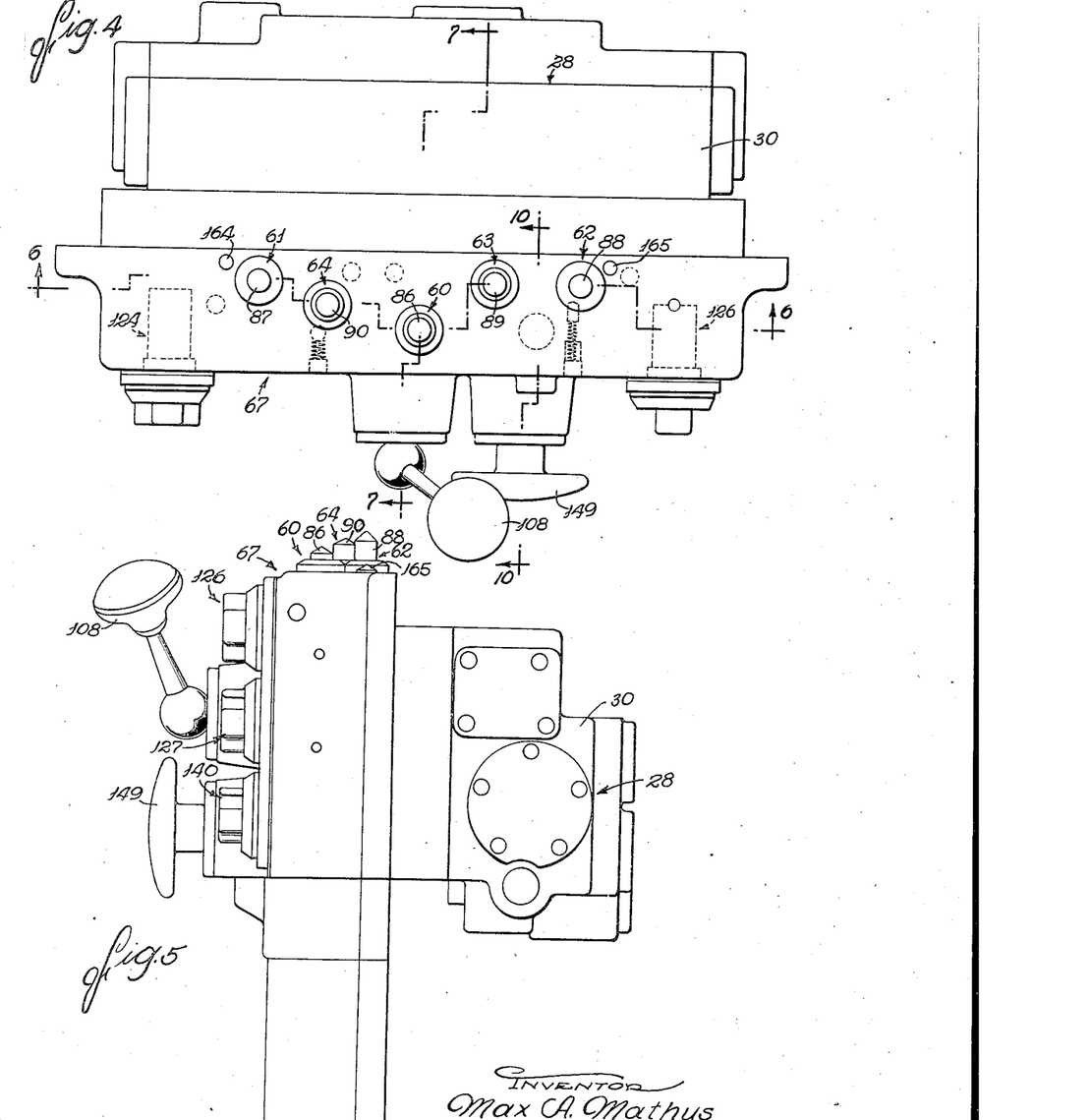
Fig. 4 is a plan view of a control panel forming part of the control mechanism and shown separately of the machine.
Fig. 5 is a side elevational view of the control panel.
Figure 7:
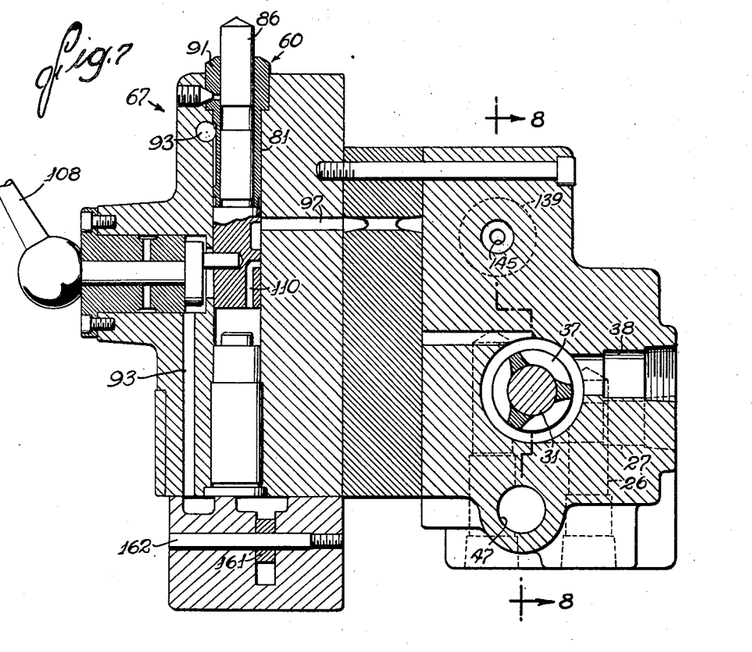
Fig. 7 is a transverse vertical sectional view through the control panel taken substantially along line 7—7 of Fig. 4.
Figures 8, 10, 11:
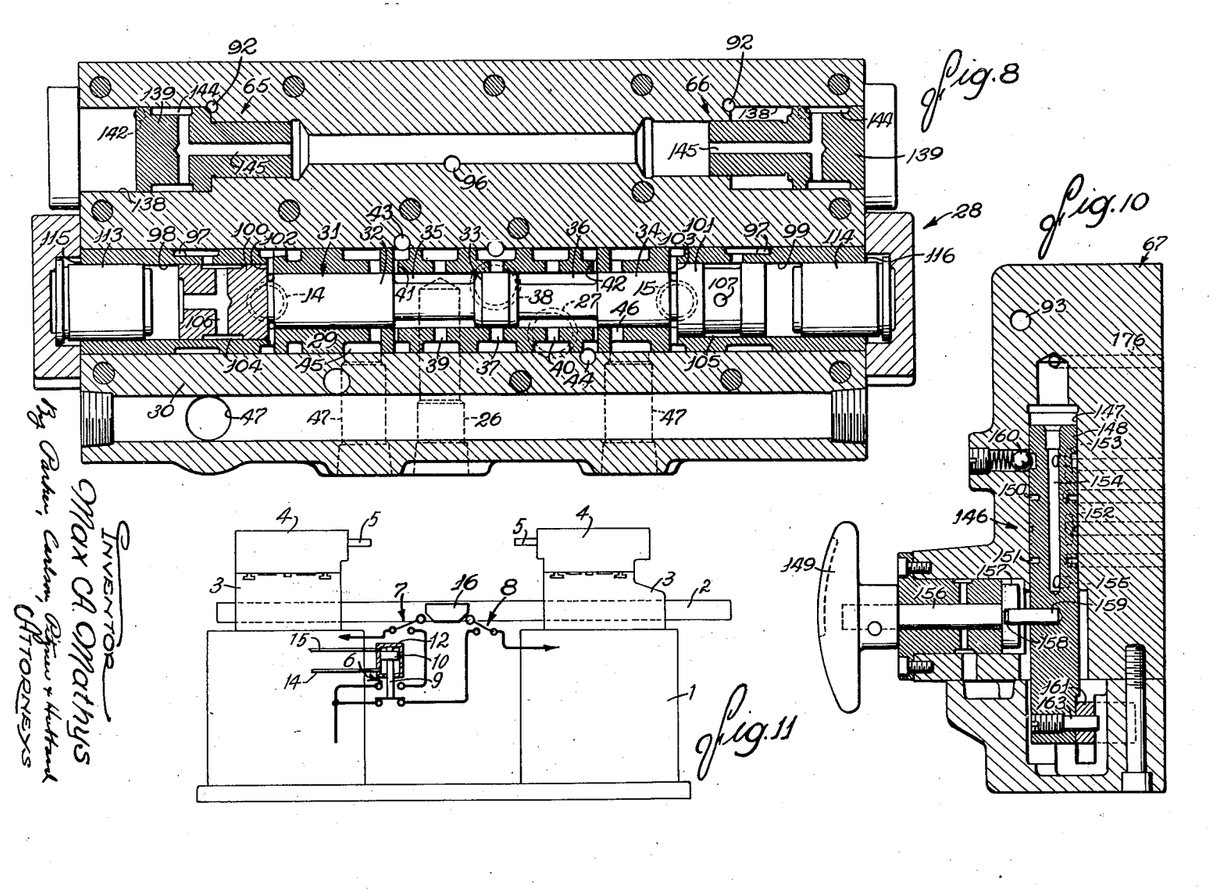
Fig. 8 is a vertical sectional view taken substantially along line 8—8 of Fig. 7.
Fig. 10 is a vertical sectional view taken substantially along line 10—10 of Fig. 4.
Fig. 11 is a rear view of the machine on a reduced scale and showing the switch control for the spindle drive.

The present invention relates primarily to a hydraulic operating mechanism for the carriage 2, the switch piston 10, and the brake pistons 19 and 20. In its preferred form, the operating mechanism comprises a hydraulic carriage motor having a cylinder 23 mounted in fixed position within the base 1, and a piston 24 reciprocable in the cylinder and connected through a piston rod 25 to the carriage 2. Opening from the cylinder 23 respectively at opposite sides of the piston 24 are two fluid supply and discharge passages, conduits or lines 26 and 27 leading to a direction valve 28 (Figs. 3 and 8).

The direction valve may be of any desired construction, and preferably comprises an elongated bore 29 defined by a fixed sleeve in a valve body 30. A valve piston 31 of the spool type, comprising axially spaced heads 32, 33 and 34 separated by annular spaces 35 and 36, is mounted for reciprocation in the bore 29. Formed in longitudinally spaced relation along and open to the periphery of the bore 29 are an annular groove or pressure port 37 connected to a pressure supply line 38, two annular grooves or cylinder ports 39 and 40 at opposite sides of the port 37 and connected respectively to the lines 26 and 27, two annular grooves or feed exhaust ports 41 and 42 outwardly of the ports 39 and 40 and connected to restricted exhaust lines 43 and 44, and two annular grooves or rapid traverse exhaust ports 45 and 46 outwardly of the ports 41 and 42 and connected to an unrestricted exhaust line 47 leading to a sump 48.

The valve ports are so arranged that when the valve piston 31 is in the left end position, both ports 45 and 41 will be open to the port 39, the port 40 will be open to the pressure port 37 and the ports 42 and 46 will be closed from the space 36, thereby establishing rapid traverse of the carriage 2 to the left; when the piston is moved one step to the right, the port 41 will still be open to the port 39, but the port 45 will be closed by the head 32, thereby establishing a feed movement to the left; when the piston is located in the central position, as shown, the pressure port 37 will be closed by the head 33 and the ports 45 and 46 will be closed by the heads 32 and 34, thereby stopping the carriage 2; when the piston is moved partially to the right, the port 39 will be opened to the pressure port 37, the port 40 will be opened to the exhaust port 42, and the ports 45 and 46 will be closed from the spaces 35 and 36, thereby establishing a feed movement to the right; and when the piston is moved into the right end position, the port 46 will be opened to the port 40 to establish rapid traverse to the right.

The pressure line 38 is adapted to be connected to any suitable source of pressure fluid, such as a power driven pump 49 having an intake line 50 opening from the sump 48. The available pressure from the pump 49 is under the control of a relief valve 51 adapted to by-pass excess fluid from the passage 38 to the sump.

The main valve 28 is a five position valve, and is operable by pilot controls comprising a plurality of pilot valves, namely, a start and stop valve 60, direction control valves 61 and 62, a rapid traverse valve 63 and a feed valve 64, operable by the carriage 2. The pilot control also includes two dwell mechanisms 65 and 66 which are available to prevent immediate institution of the rapid return at the ends of the feed strokes in opposite directions.

The various operating elements of the pilot control, together with the main control valve 28 are incorporated in a unitary control panel 67 which is mounted on the front of the base 1, and which is so arranged that the pilot valves 60 to 64 are operable selectively by suitable control dogs 68, 69, 70, 71 and 72 adjustably mounted in a T-slot 73 in the front side of the carriage 2. By selection and adjustment of the dogs, and by adjustment of the rate of feed and the selective use and adjustment of the dwell mechanisms 65 and 66, various machine cycles differing in movement rates and sequences may be obtained.

The pilot valves 60 to 64 comprise a plurality of vertical bores 81 to 85 formed in and opening to the top of the panel 67, and a plurality of spool valve plungers 86 to 90 reciprocable in the bores and projecting therefrom through bushings 91 for selective actuation by the dogs 68 to 72. Pressure fluid from the passage 38 is directed through a branched line or passage 92 to the respective valve bores 81 to 85, and acts against the upper piston areas of the spool plungers 86 to 90. A leakage drain line 93 opens from the upper end portion of each of the valve bores 81 to 85 to the sump 48.

The start and stop valve 60 is available to effect adjustment of the main control valve 28 into neutral position. Thus, the valve bore 81 has appropriately arranged port connections 94 and 95 with an exhaust line 96 connected through the line 47 to the sump 48, and has an additional port connection with a branched line 97 opening to slightly enlarged opposite end portions of the main valve bore 29. These portions constitute cylinders 98 and 99 in communication at their inner ends with the central portion of the valve bore 29 in which the valve member 31 is reciprocable. Two floating stop pistons 100 and 101 are slidable respectively in the inner ends of the cylinders 98 and 99 and are adapted for direct separable engagement with opposite ends of the main spool valve 31. Annular shoulders 102 and 103 limit inward movement of the pistons 100 and 101 so that when the latter are actuated by pressure fluid admitted through the line 97 they will confine the spool valve 31 in intermediate stop position. The stop pistons 100 and 101 are formed respectively with wide peripheral grooves 104 and 105 always in communication with the branches of the line 97, and with internal passages 106 and 107 opening from the grooves to the outer end faces of the pistons. When the stop plunger 86 is depressed (as shown in Fig. 3), the lines 92 and 97 are connected and hence the pistons 100 and 101 are held against the shoulders 102 and 103 at the inner ends of the cylinders 98 and 99 to center the spool valve 31. When the plunger 86 is elevated, the line 97 is connected through the port 94 to the exhaust line 96 and the spool valve 31 is released for actuation under the control of the direction pilot valves 61 and 62 as hereinafter described.

The plunger 86 may be operated manually from the front of the panel 67 by means of a hand lever 108 to start and stop the carriage 2, and is self-maintained in either position. When the plunger 86 is elevated to start the operation, it is locked in operative position by pressure fluid in the lower end of the bore 81 supplied from the line 92 through a branch line 109. When the plunger 86 is depressed to stop the operation, the line 109 is closed, and the lower end of the bore 81 is vented through a passage 110 in the plunger and through the restricted port connection 95 to the exhaust line 96.

The pilot valves 61 and 62 are operable respectively to institute the left and right movements of the carriage 2, and to reset each other alternatively for coaction with the dogs 69 and 70. Each has port connections with the supply and exhaust lines 92 and 96, and with cross lines 111 and 112 opening respectively to the lower ends of the valve bores 83 and 82 and also to the inner ends of the cylinders 99 and 98. The port connections are so arranged that when the plunger 87 is depressed, the line 92 will be connected to the line 111, thereby causing upward movement of the plunger 88 to connect the line 112 to the exhaust line 96. As a result, the plunger 87 is locked in depressed position, the plunger 88 is held in its upward position, and the direction valve 31 is shifted to the left to institute the carriage movement to the left. Conversely, when the plunger 88 is depressed, pressure fluid is supplied through the line 112 to the lower end of the bore 82 to raise the plunger 87 and connect the line 111 with the exhaust line 96. As a result of the attendant outward movement of the plunger 87, fluid is exhausted from the inner end of the cylinder 99 so that the spool valve 31 is moved to the right to institute carriage movement to the right.

The pilot valves 89 and 90 control each other and also the valve 28 for selective rapid traverse and feed. The feed positions of the main spool valve 28 are determined by feed limit pistons 113 and 114 reciprocable in the outer ends of the cylinders 98 and 99 and limited in their inward movement by shoulders 115 and 116. A branched line 117 opens in parallel to the outer ends of the cylinders 98 and 99, and is adapted to be connected by the feed control valve 64 either to the pressure line 92 when the plunger 90 is depressed or to the exhaust line 96 when the plunger is fully elevated. Upon supply of pressure fluid to the line 117, the feed pistons 113 and 114 are moved into their innermost position, as shown in Fig. 3, against whatever pressure may exist in the inner end of one or the other of the cylinders 98 and 99, and serve through end abutment with the pistons 100 and 101 to limit the range of movement of the valve member 31 so that the exhaust ports 45 and 46 will remain closed during the movement of the table or carriage 2.

The rapid traverse valve 63 has appropriate port connections with the pressure line 92, the exhaust line 96 and a cross line 118 leading to the lower end of the feed valve bore 85. The line 117, leading from the feed valve 64 has a branch cross line 119 opening to the lower end of the bore 84. Hence, the rapid traverse plunger 89 is elevated when the feed plunger 90 is depressed, and thereupon relieves the line 118 to lock the latter in depressed position. Likewise, the feed plunger 90 is moved into elevated position when the plunger 89 is depressed, and thereupon relieves the line 119 to lock the latter plunger in depressed position.

The feed valve 64 also controls connection of the exhaust lines 43 and 44 to the drain to obtain a plurality of selective feeds in either direction of carriage movement. Thus, the bore 85 has appropriate port connections with the lines 43 and 44, with two parallel lines 120 and 121 connected to the exhaust line 96, and with two other parallel lines 122 and 123 also connected to the exhaust line. These port connections are so arranged that when the plunger 90 is fully elevated, the lines 43 and 44 are blocked or closed; when the plunger is partially depressed, the line 43 is connected to the line 120 and the line 44 is connected to the line 122; and when the plunger is fully depressed, the lines 43 and 44 are connected respectively to the lines 121 and 123.

Suitable flow restrictions, preferably adjustable orifice valves 124 to 127, are interposed respectively in the parallel lines 120 to 123. Preferably, these orifice valves are alike in construction, each being independently adjustable from the front of the panel 67. The orifice valves control the escapement of motive fluid from the motor cylinder 23, and hence their adjustment determines the rate or rates of feed in either direction of carriage travel. The two valves 124 and 126 may be adjusted to obtain a fast feed and the two valves 125 and 127 may be adjusted to obtain a slow feed. Assuming the valves to be so adjusted, partial depression of the plunger 90 will institute a rapid feed and full depression of the plunger will institute a slow feed, in either direction of carriage movement depending on which of the direction pilot valves 61 and 62 is depressed.

To maintain the intermediate adjustment of the valve 64 for fast feed, the plunger 90 is rigid at the lower end with a hollow enlargement 128 loosely movable in a chamber 129 connected at the one end to the line 118. Pressure fluid from the line 118 will pass along the enlargement to the other or lower end of the chamber 129. Formed in enlargement 128 is a cylinder 130 open to an axial bore 131 in the plunger 90. A piston 132 is reciprocable in the cylinder 130 and has an axial stem 133 adapted to project through the lower end wall for engagement with the bottom wall of the cylinder 129. The piston 132 is exposed to the pressure in the chamber 129, and is limited in its outward movement by a snap ring 130ᵃ located in a groove 130ᵇ in the wall of the cylinder 130. A coil compression spring 134 in the bore 131 tends to urge the piston 132 downwardly in the cylinder 130. The upper end of the bore 131 opens to a transverse bore 135 adapted for connection, when the plunger 90 is in intermediate or elevated position, with an annular groove 136 in the valve bushing 91 always in communication with the pressure line 92, and for connection when the plunger is fully depressed with the drain line 93. The upper end of the cylinder 130 is vented through a passage 137 in the piston 132 to bore 131, and the lower end is open to the cylinder 129.

In operation, when the plunger 90 is partially depressed into fast feed position, as shown in Fig. 3, the opposite ends of the cylinder 129 are exhausted. Fluid pressure acting on the upper end of the differential plunger 90 tends to urge the latter downwardly but also projects the stem 133 to limit the downward movement. When the plunger 90 is fully depressed, the upper end of the cylinder 130 is also exhausted, and thereupon the pressure acting on the upper end of the plunger serves to lock the latter in the slow feed position.

When the selective feed control plunger 90 is partially depressed into fast feed position, the pressure line 92 is connected with line 117 for holding the feed pistons 113 and 114 in their innermost positions, and through the line 119 to lock the rapid traverse valve 63 in its upward position. At the same time, the first feed control orifice valves 124 and 126 are connected to control the passage of fluid out of the motor 23 through lines 43 or 44. When the selective feed valve plunger 90 is further depressed to its slow feed position, the connections remain unchanged except that the second feed orifice valves 125 and 127 are connected into the lines 43 and 44. Upon depression of the rapid traverse plunger 89, the pressure line 92 is connected to line 118 to lift the selective feed plunger 90 to its uppermost position. Line 117 is thereby connected to exhaust line 96 to relieve the pressure on the outer ends of the feed pistons 113 and 114, allowing these pistons to move to their outermost positions and permitting the valve piston 31 to move in the direction determined by the directional valves 61 or 62 to connect the lines 26 or 27 directly with the sump through rapid traverse exhaust ports 45 or 46. For any setting of the selective feed valve 64, the direction of table travel will be determined by the direction valves 61 and 62. Thus, by proper setting of the machine controls, practically any desired series of table movements is obtainable.

On occasion, it may be desirable to delay the reversal of the carriage 2 at either end of the reciprocation, and the two dwell mechanisms 65 and 66 are selectively available for this purpose. Preferably, the dwell mechanisms are alike in construction so that a description of one will suffice for both. The mechanism 65 comprises a cylinder 138 in which a differential spool piston 139 is reciprocably disposed. One end of the cylinder 138, facing the small area of the piston 139, is constantly connected through an adjustable restricted orifice valve 140 to the pressure line 92. The other end of the cylinder 138, facing the large area of the piston 139, opens to a line 141. Another line 142 opens from an intermediate point in the cylinder 138, and is adapted to be uncovered by the piston 139, when the latter is moved into one extreme position by the application of a differential pressure. A manually adjustable two-position valve 143 in the line 112 is available selectively to connect the dwell mechanism 65 operatively into the line 112, or to disconnect the mechanism when immediate carriage reversal is desired. In one position, the valve 143 leaves the line 112 uninterrupted, and interconnects the lines 141 and 142. In the other position, the valve 143 serves in effect to interpose the dwell mechanism 65 in the line 112 by connecting the pressure end to the line 141 and the other end to the line 142. Formed in the periphery of the piston 139 is an annular groove 144 connected through a passage 145 in the piston to the exhaust line 96. In operation, fluid pressure from the line 92 passing through the control orifice 140 tends to locate the piston 139 normally in its outer position in which communication between the lines 141 and 142 is interrupted and in which the line 142 is open to the exhaust groove 144. When the direction valve 62 is actuated to condition the system for movement of the carriage 2 to the right, the line 112 is connected to the pressure line 92. If the valve 143 is adjusted as shown in Fig. 3 to connect the dwell mechanism 65, pressure fluid will now be supplied through the pressure end of the line 112, the valve 143 and the line 141 to the large end of the cylinder 138, and will be blocked by the piston 139 from the other end of the line 112 opening to the underside of the plunger 87. Consequently, the plunger 87 will not be elevated to institute carriage reversal. By reason of the differential areas of the piston 139, both of which are now exposed to pressure, the piston 139 will move progressively into its other end position. The time required for this movement, which determines the length of the dwell period, is controlled by the setting of the orifice valve 140. At the end of the piston movement, the exhaust groove 144 moves out of communication with the line 142, and the latter is uncovered to communicate with the line 141, thereby establishing the flow connection through the line 112 to the inner end of the bore 82. The direction plunger 87 is now elevated and as a result it disconnects the line 111 from the pressure line 92 and connects it to the exhaust line 96 so as to establish the direction plunger 88 in depressed position. Since the line 112 is now connected to pressure and the line 111 is connected to exhaust, the valve piston 31 will be shifted to the right to institute carriage movement to the right.

Figure 9:
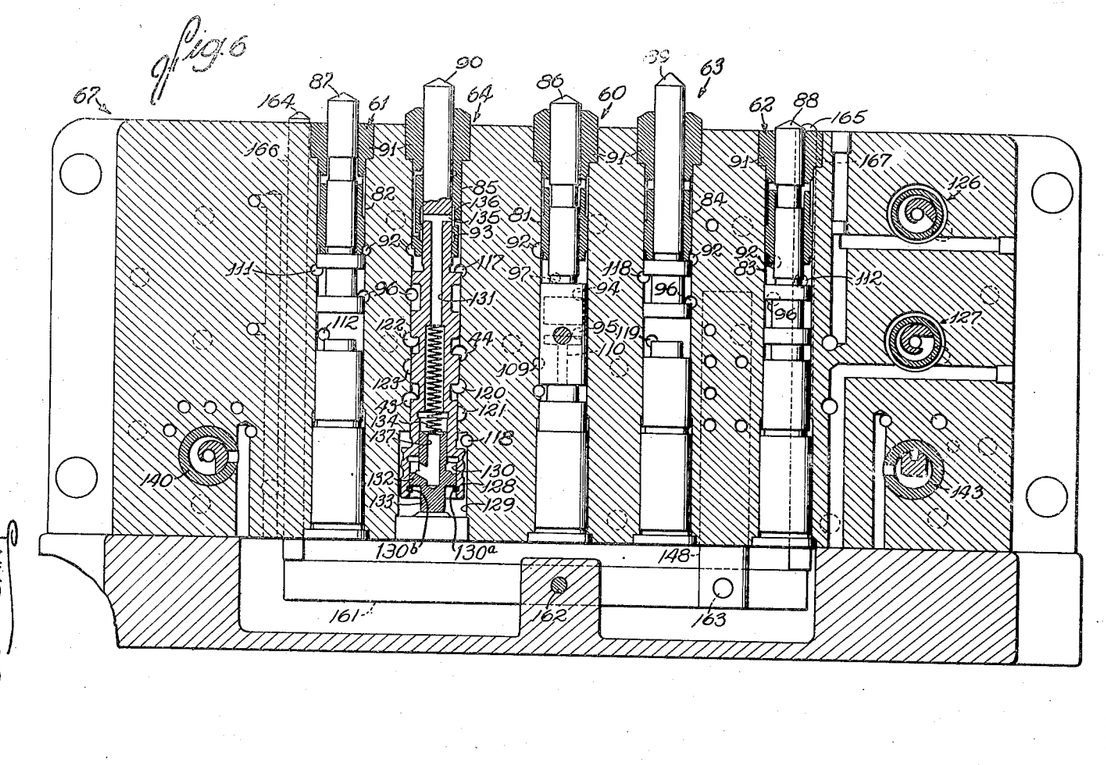
Fig. 9 is a vertical sectional view taken substantially along line 9—9 of Fig. 2.

The dwell mechanism 66 is identical except for the line connections, the valve 143 in this instance being interposed in the cross line 111. In Fig. 3, the valve 143 for the dwell mechanism 66 is in the adjusted position to establish a direct flow connection through the line 111 and hence to render the dwell mechanism functionally inoperative. Both valves 143 are mounted in the control panel 67 for adjustment from the front of the machine. Preferably, the valves 140 and 143 for each dwell mechanism are connected for joint operation as illustrated in Fig. 9, the valve 143 when in position to connect the dwell mechanism permitting a predetermined range of adjustment of the valve 140 without disturbing the connections of the lines 141 and 142 with the interrupted portions of the line 111 or 112.

Figures 9, 12:
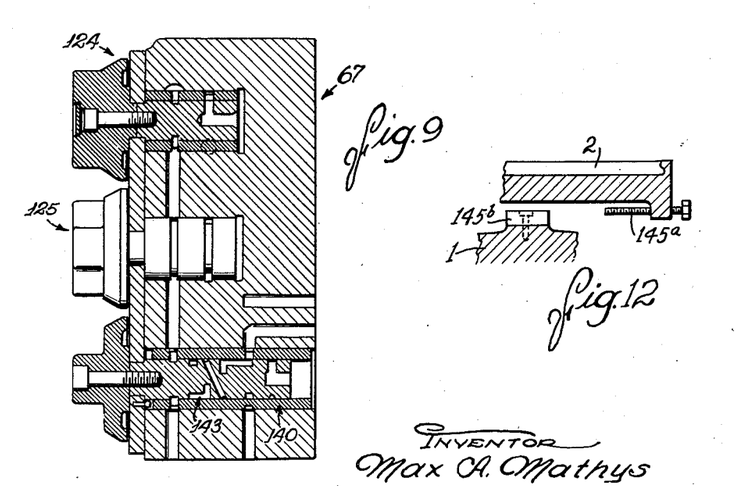
Fig. 12 is a sectional detail view showing a carriage stop for use during a dwell.

It will be understood that during a dwell operation at either end of the carriage reciprocation, the carriage is held positively against movement until reversal is effected. This may be effected in any suitable manner. Preferably, as illustrated in Fig. 12, a stop screw 145ᵃ is adjustably threaded through the end flange of the carriage 2 and arranged for endwise abutment with a block 145ᵇ rigidly secured to the base 1 beneath the carriage. Similar positive stop means is provided at both ends of the machine for coaction respectively with the dwell mechanisms 65 and 66.

One of the important features of the invention is to provide a manual control whereby immediate reversal of the carriage 2 in either direction may be effected when the dwell mechanisms 65 and 66 are conditioned for operation in the automatic cycle. In the absence of such control, it would be impossible to effect immediate reversal of the carriage in the event of an emergency, since the dwell mechanism would first have to operate, and the table would continue to move during the dwell period.

The manual control comprises a valve 146 having three positions of adjustment. In the intermediate position, the valve 146 establishes the normal flow connections through the cross lines 111 and 112. In one end position, the valve 146 by-passes the valves 61 and 62 and the dwell mechanism 65 to supply pressure fluid directly to the lower end of the plunger 87 and to exhaust the lower end of the plunger 88, thereby instituting immediate movement of the carriage to the right. In the other end position, the valve 146 by-passes the valves 61 and 62 and the dwell mechanism 66 to supply pressure fluid directly to the lower end of the plunger 88 and to exhaust the lower end of the plunger 87, thereby instituting immediate movement of the carriage to the left. This is accomplished by interposing the valve 146 in the cross lines 111 and 112, and by providing selective port connections for the end portions of these lines leading to the lower ends of the valve bores 83 and 82 respectively and reversibly with the pressure and exhaust lines 92 and 96.

The valve 146 comprises a bore 147 formed in the panel 67, and a reciprocatory valve plunger 148 in the bore. A manually operable control knob 149 adjustable from the front of the panel is operatively connected to the valve plunger 148 to shift the latter selectively into any one of its three positions of adjustment. The valve plunger 148 has two peripheral grooves 150 and 151 adapted in the central position to connect the port holes of the interrupted sections of the lines 111 and 112 so as to establish the normal flow passages therethrough. Also formed in the plunger 148 are two longitudinal slots 152 and 153 in constant communication respectively with the port holes of branches of the pressure and exhaust lines 92 and 96 opening to the bore 147. The exhaust slot 153 is connected through a passage 154 in the plunger 148 to an exhaust port 155. The arrangement is such that upon upward movement of the valve plunger 148, the lines 111 and 112 will be interrupted, and the portions thereof leading to the lower ends of the valves 62 and 61 will be connected respectively to the pressure and exhaust lines 92 and 96. More particularly, the line 92 will be connected through the slot 152 to the line 111, and the line 112 will be connected through the port 155, the passage 154 and the slot 153 to the line 96. In the lower position of the valve plunger 148, these connections will be reversed, i. e., the line 92 will be connected through the slot 152 to the line 112, and the line 111 will be connected through the slot 153 to the line 96. The hand knob 149 is so connected to the plunger 148 that its position of adjustment to the right or left will indicate the corresponding direction of carriage travel. More particularly, the hand knob 149 is secured on a shaft 156 journaled in and extending through the front wall of the panel 67. The inner end of the shaft 156 is rigid with a circular head 157 formed with a radial slot 158. A pin 159 mounted on the front of the valve plunger 148 and to the right side of the axis of the shaft 156 projects into the slot 158. Consequently, rotation of the knob 149 to the left in a counter-clockwise direction will elevate the plunger to institute movement of the carriage 2 to the left and rotation to the right in a clockwise direction to lower the plunger to institute movement of the carriage to the right. A suitable spring detent 160 is provided for normally maintaining the valve plunger 148 in intermediate position. The plunger is adequately supported in its upper and lower positions of adjustment by friction. Opposite ends of the bore 147 are normally connected to the exhaust line 96 to facilitate free adjustment of the valve plunger 148.

A mechanical interlock is provided for preventing actuation of the manual control valve 146 out of central position in a direction to effect continued movement of the carriage beyond the limits defined by the direction control dogs 69 or 70. Referring to Fig. 6, this mechanical interlock comprises a lever 161 pivoted intermediate its ends at 162 in the panel and pivotally connected adjacent one end at 163 to the lower end of the valve plunger 148. Two vertical reset pins 164 and 165 extend reciprocably through bores 166 and 167 in the panel 67. The lower ends of the pins 164 and 165 are in engagement with the upper edge of the lever 161 respectively at opposite ends. The upper ends of the pins project from the panel 67 respectively adjacent the plungers 87 and 88 for engagement by the reversing dogs 69 and 70 on the carriage 2. In the present instance, the lower flat faces of the direction dogs 69 and 70 are of such length that they will overlie the reset pins 164 and 165 respectively while actuating the direction valves 61 and 62. Consequently, if the manual control valve 146 is in central position, the acting direction dog, when engaging the associated direction valve, will prevent upward movement of the adjacent reset pin out of central position. The other reset pin, however, is free to move upwardly so that the valve 146 may be actuated at any time to effect immediate carriage reversal up to the point where automatic reversal would occur and even during the dwell period. If the manual control valve 146 has been actuated out of central position, it is allowed to remain in such position until automatic reversal is instituted, at which time the associated reversing dog will depress the associated reset pin to return the valve into central position.

In operation, the machine will operate in accordance with its normal automatic cycle as determined by the setting of the control dogs 68 to 72 when the manual control valve 146 is in central position. By appropriate adjustment of the valves 143, the automatic cycle may be conditioned for a dwell before reversal at either or both ends of the reciprocation. Adjustment of the valve 63 by its dog 71 will relieve the pressure acting on the outer ends of the feed pistons 113 and 114 to enlarge the range of reciprocation of the valve piston 31 so as to obtain rapid traverse. Actuation of the feed valve 64 by its dog 72 will reset the valve 63 for automatic actuation and will reestablish pressure against the outer ends of the pistons 113 and 114 to limit adjustment of the main valve piston 31 to a feed range. In the partially depressed position of the valve 64, the orifices 124 and 126 will be functionally operative to effect a fast rate of feed in either direction. In the fully depressed position of the valve 64, the orifices 125 and 127 will be functionally operative to effect a slow rate of feed in either direction. Assuming that the carriage 2 is traveling to the right, actuation of the valve 61 by the dog 69 will reset the valve 62 and thereupon the line 111 will be connected to pressure and the line 112 will be connected to exhaust so as to shift the valve piston 131 to the left and thereby effect reversal of the carriage movement to the left. With the dwell mechanism 66 functionally disconnected, as shown in Fig. 3, this reversal will occur immediately. However, if the dwell mechanism 66 is conditioned for operation, there will be a dwell period before the valve 62 is reset to effect the carriage reversal. At the end of the movement to the left the valve 62 will be actuated to reset the valve 61, and thereupon the pressure and exhaust connections to the lines 111 and 112 will be reversed so as to shift the valve piston 31 to the right and thereby reinstitute movement of the carriage to the right. If the dwell mechanism 65 is conditioned for operation as shown in Fig. 3, a dwell period will occur before the valve 61 is reset so as to delay automatic reversal of the carriage. With the dwell mechanism 66 functionally disconnected, as shown in Fig. 3, this reversal will occur immediately. However, if the dwell mechanism 66 is conditioned for operation, there will be a dwell period before the valve 61 is reset to effect the carriage reversal.

At any time in the automatic cycle thus far described, the manual control valve 146 may be actuated out of central position to effect an immediate reversal of the carriage 2. For example, assuming that the carriage 2 is moving to the left, the valve 62 will be up and the valve 61 will be down. Under these conditions, the manual control valve 146 may be adjusted into its upper position without affecting the automatic cycle. The reset pin 165 will be projected upwardly alongside the plunger 88, but will be depressed by the dog 70 as an incident to the automatic reversal to recenter the valve 146. However, if the valve 146 is adjusted into its lower position, that portion of the line 111 opening to the lower end of the bore 83 will be connected to exhaust instead of pressure, and that portion of the line 112 opening to the lower end of the bore 82 will be connected to pressure instead of exhaust so that the two valves 61 and 62 will operate without dog engagement to effect immediate reversal of the carriage 2. This will project the reset pin 164 upwardly, but upon subsequent automatic reversal the pin will be depressed by the dog 69 to recenter the valve 146.

Assuming that the carriage 2 has moved to the right and then to the left past the center position and is again moving to the right, upon engagement of the stop dog 68 with the valve 60, pressure fluid will be directed through the line 97 to move the stop pistons 100 and 101 inwardly so as to center valve piston 31 and thereby automatically stop the carriage.

The hydraulic transmission is well adapted for remote manual control. In Fig. 3, remote controls are illustrated for starting, stopping and reversing the carriage 2, and for changing the rate of carriage travel.

When remote control of the start and stop valve 60 is desired, a flow restriction 166 is inserted in the branch pressure line 109, and a control line 167 is connected at one end to the lower end of the valve bore 81. The other end of the line 167 is connected to a remote control valve 168. In the form shown, this valve comprises a rotary valve plug 169 having a hand lever 170 normally maintained in neutral position by centering springs 171 to close the line 167. The plug 169 is rotatable out of neutral position in opposite directions to connect the line 167 respectively to the pressure line 92, thereby resulting in adjustment of the valve 60 to start the carriage operation, or to the exhaust line 96, thereby resulting in adjustment of the valve 60 to stop the carriage.

When remote control of the rapid traverse and feed valves 63 and 64 is desired, a flow restriction 172 is inserted in the line 119, and a control line 173 is connected to this line at a point between the restriction and the valve bore 84. The remote end of the control line 173 is connected to a manual control valve 174 similar to the valve 168. In neutral position, the valve 174 blocks the line 173. In one extreme position, the valve 174 serves to connect the line 173 to the pressure line 92. Consequently, the valve plunger 89, if down, will be elevated to institute feed operation. In the other extreme position, the valve 174 serves to connect the line 173 to the exhaust line 96. Consequently, the plunger 89, if up, will be lowered to institute rapid traverse operation.

It will be understood that during exhaust conditions, the restrictions 166 and 172 serve to permit lowering of the pressures in the lower ends of the valve bores 81 and 84 respectively.

When remote control of the valve 146 is desired, plugs 175 are inserted in branch exhaust lines 176 opening from opposite ends of the bore 147 and normally connected to the leakage drain line 93. The lines 176 are connected by a cross line 177. Interposed in the cross line 177 is a remote control valve 178 comprising a plug 179 with a hand lever 180 normally maintained in central position by springs 181. When in central position, the valve 178 opens the line 177 to the exhaust line 96 so that the valve 146 may be freely adjusted by means of the control knob 149. Movement of the valve 178 out of central position reversibly in opposite directions will connect the opposite ends of the valve bore 147 respectively and reversibly to the pressure and exhaust lines 92 and 96 so as to effect selective adjustment of the valve 146 into its opposite end positions. To disable the valve 178 when remote control is not desired, the plugs 175 may be removed, and plugs 182, indicated in dotted outline, may be inserted in opposite ends of the cross line 177.

I claim as my invention:

1. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, pilot valve means operable respectively by said element upon movement of the latter into opposite end positions for reversing said direction valve, a dwell mechanism included in said first-mentioned means and operable upon actuation of said pilot valve means to delay reversal of said direction valve, and manual control means available at will for effecting immediate reversal of said direction valve independently of said pilot valve means and of said dwell mechanism.

2. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, automatic pilot valve means operable by said element for controlling said direction valve, and manual pilot valve means for controlling said automatic pilot valve means independently of said element.

3. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, automatic pilot valve means operable by said element to effect reversal of said direction valve at opposite ends of movement of said element, and manual pilot valve means for effecting reversal of said direction valve at an intermediate point within said range of movement independently of said element.

4. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, automatic pilot valve means operable by said element to effect reversal of said direction valve at opposite ends of movement of said element, and manual pilot valve means for controlling said automatic pilot valve means to effect selective reverse of said direction valve independently of said element.

5. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, automatic pilot valve means operable by said element to effect reversal of said direction valve at opposite ends of movement of said element, manual pilot valve means for effecting reversal of said direction valve at an intermediate point within said range of movement independently of said element, and remote control pilot valve means for operating said manual pilot valve means.

6. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, automatic pilot valve means operable by said element to effect reversal of said direction valve at opposite ends of movement of said element, manual pilot valve means for effecting reversal of said automatic pilot valve means independently of said element, and interlocked means for preventing said manual pilot valve means from effecting continuation of said movement beyond said opposite ends.

7. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, automatic pilot valve means operable by said element for controlling said direction valve, second pilot valve means having a neutral position in which said automatic pilot valve means is functionally operative, and being adjustable out of neutral position into two different positions selectively to effect adjustment of said direction valve whereby to effect movement of said element in either direction independently of control by said element.

8. A hydraulic operating mechanism for a reversible movable element of a machine tool comprising, in combination, a reversible hydraulic motor for driving said element selectively in opposite directions, a source of fluid under pressure, means including a reversible direction valve for directing fluid from said source alternately to opposite ends of said motor, automatic pilot valve means operable by said element for controlling said direction valve, second pilot valve means having a neutral position in which said automatic pilot valve means is functionally operative, being adjustable out of neutral position into two different positions selectively to effect adjustment of said direction valve whereby to effect movement of said element in either direction independently of control by said element, and means for automatically insuring setting of said second pilot control means in said neutral position upon movement of said element to a predetermined position.

9. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, two pilot valves operable respectively to effect reversal of said direction valve in opposite directions, spaced dogs on said element alternately engaging said respective pilot valves upon movement of said element respectively into opposite end limit positions, and secondary pilot valve means selectively adjustable to effect reversal of said direction valves in either direction within the range between said limit positions independently of actuation of said pilot valves by said dogs.

10. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, two pilot valves operable respectively to effect reversal of said direction valve in opposite directions, spaced dogs on said element alternately engaging said respective pilot valves upon movement of said element respectively into opposite end limit positions, secondary pilot means having an idle position in which said pilot valves are in automatic control of said direction valve and having an operative position for effecting movement of said element in one direction independent of control of said pilot valves by said dogs, and mechanical interlock means operable by one of said dogs to return said secondary pilot valve means to neutral position at the end of said last mentioned movement of said element.

11. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, two pilot valves operable respectively to effect reversal of said direction valve in opposite directions, spaced dogs on said element alternately engaging said respective pilot valves upon movement of said element respectively into opposite end limit positions, means operable upon actuation of one of said pilot valves at one of said limit positions to delay actuation of said direction valve for a predetermined dwell period with said element constrained against movement by a fixed stop, and secondary pilot valve means operable at will independently of said last mentioned means for effecting immediate actuation of said direction valve.

12. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, two pilot valves operable respectively to effect reversal of said direction valve in opposite directions, spaced dogs on said element alternately engaging said respective pilot valves upon movement of said element respectively into opposite end limit positions, means operable upon actuation of one of said pilot valves to delay actuation of said direction valve for a predetermined period, and secondary pilot valve means operable to by-pass said last mentioned means and to effect immediate reversal of said direction valve.

13. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, pilot valve means operable respectively by said element upon movement of the latter into opposite end positions for controlling said direction valve and including two control lines adapted for alternate and interchangeable connection to said source and exhaust, hydraulic control means available at will for operating said pilot valve means to effect reversal of said direction valve independently of operation of said pilot valve means by said element, said hydraulic control means comprising a manually operable valve interposed in said control lines and selectively adjustable into a neutral position to establish normal control of said direction valve by said pilot valve means or into one or the other of two operation positions depending on the direction of movement of said element to interchange the connection of said lines to said source and exhaust, and a manual actuator for said control means and being adjustable in the same general direction as the direction of movement of said element instituted thereby.

14. A hydraulic operating mechanism for a reversibly movable element of a machine tool comprising, in combination, a reversible hydraulic motor for driving said element selectively in opposite directions, a source of fluid under pressure, means including a reversible direction valve for directing fluid from said source alternately to opposite ends of said motor, and for controlling the rate of movement of said element in either direction, said valve comprising a bore, a reciprocatory valve member in said bore having an intermediate neutral position, opposite end feed positions within a limited range of adjustment, and opposite end rapid traverse positions within a full range of adjustment, direction pilot valve means for directing fluid from said source selectively to opposite ends of said member to effect reversal thereof, two cylinders opening respectively to opposite ends of said bore, two stop pistons in the inner ends of said cylinders and operable inwardly into limit positions to locate said member in said neutral position, valve means for selectively directing fluid from said source to the outer ends of said pistons or relieving said pistons, two speed control pistons in the outer ends of said cylinders and operable inwardly into limit positions to act through said stop pistons to define said limited rang outwardly to define said full range, and valve means for selectively directing fluid to the outer ends of said control pistons or relieving said control pistons.

MAX A. MATHYS.